N. K. BOWMAN.
TOOL FOR SPLICING CABLES.
APPLICATION FILED FEB. 3, 1920.
1,399,101.
Patented Dec. 6, 1921.
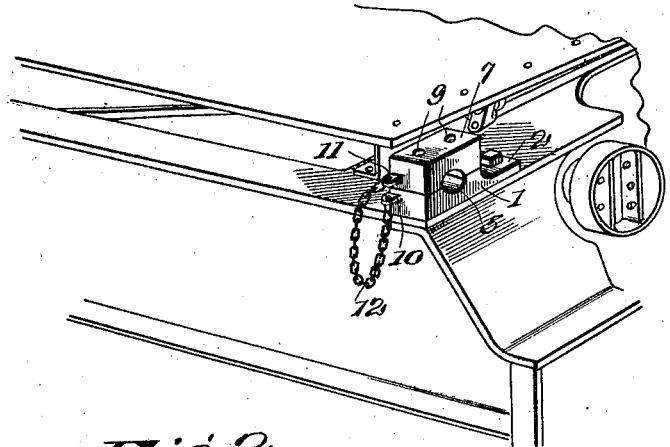
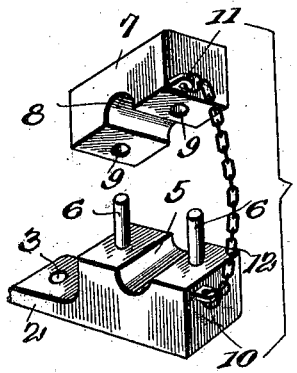
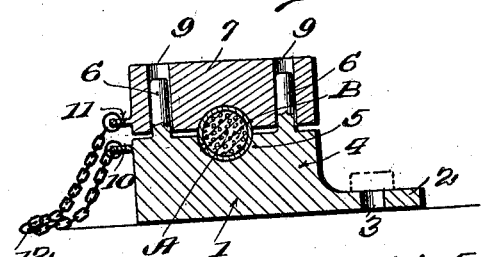
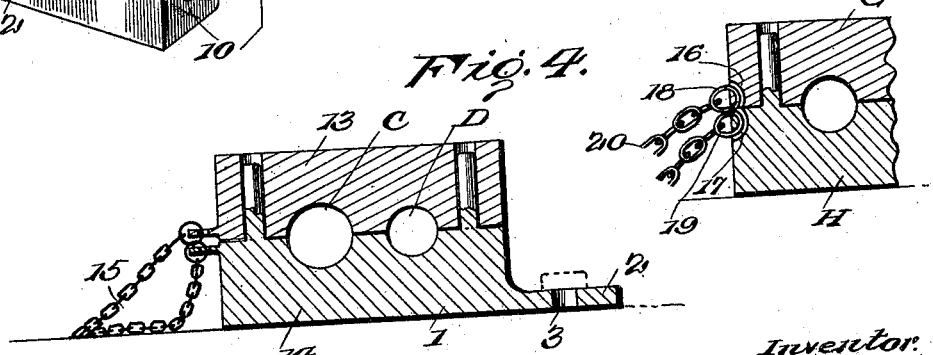
Inventor.
N. K. Bowman.

UNITED STATES PATENT OFFICE.

NEWTON K. BOWMAN, OF CANTON, OHIO.

TOOL FOR SPLICING CABLES.

1,399,101.

Specification of Letters Patent.   Patented Dec. 6, 1921.

Application filed February 3, 1920. Serial No. 356,071.

*To all whom it may concern:*

Be it known that I, NEWTON K. BOWMAN, a citizen of the United States, residing at Canton, in the county of Stark and State of Ohio, have invented certain new and useful Improvements in Tools for Splicing Cables, of which the following is a specification.

This invention relates to a tool for splicing cables by means of such splicing members as are set forth in the claims of my previous Patent No. 1,304,534, issued May 27, 1919, or by means of any split member encircling the joined ends of two cables.

The invention provides a tool whereby compressing dies are brought together by a blow on one of the dies for the purpose of contracting a splicing member around the juncture of two cable ends.

A further object of the invention is to provide a tool which comprises two parts so associated and formed that they not only form a splicing tool but provide an anvil.

Another object of the invention is to provide a tool of two parts which, while separable, are connected together so that either part may not be lost.

Yet another object of the invention is to provide means on one of the members of the tool for coöperation with the other member so that the two members cannot be placed together except in properly registering relation.

One other object is to provide a tool which may be used for splicing duplex cables, or for splicing two strands of a cable simultaneously.

In the drawings:

Figure 1 is a view, in perspective, of a mining machine or the like having one of the tools applied thereto;

Fig. 2 is a perspective view of the tool removed from the machine shown in Fig. 1;

Fig. 3 is a longitudinal section through the tool;

Fig. 4 is a similar section through a modified form of the tool;

Fig. 5 is a fragmentary view of a modified form of chain attaching means.

In detail:

The tool as shown in Figs. 1 to 4 inclusive is capable of application to mining machines, motors or the like, or in fact any location where a splicing tool may be needed.

In the form of the tool shown in Figs. 1 to 3 inclusive, a base member 1 having an ear 2 apertured as at 3 is seated as shown in Fig. 1 on any substantial part of a mining machine, motor or the like. The base member 1 is provided with a head 4 containing one jaw 5 of the splicing member die embodied in the complete tool. The head 4 also carries dowels 6 for coöperation with the upper half of the tool.

The upper half of the tool is indicated at 7 and carries the upper half 8 of the dies, said upper half registering exactly with the lower jar 5 as indicated in Fig. 3, registration of the two being insured by reason of the fact that holes 9 in the upper half 7 are provided and which receive the dowels 6 of the lower half. The dowels 6 are only of sufficient length to insure registration of the two halves being maintained and, as shown in Fig. 3, do not project above the upper surface of the upper half 7; the reason for this being that the upper face of the upper half 7 forms an anvil surface for use in splicing the cables, the ends to be spliced being laid on this face and tapped or hammered for placing them in proper condition for splicing. In Fig. 3 the joined cable ends are shown at A located within the tool and the splicing collar B is ready for contraction therearound. Inasmuch as the upper and lower members 4 and 7 of the tool are slightly separated by the large diameter of the splicing member B a blow on the upper member 7 will serve to contract the splicing member B, and will bring the confronting faces of the upper and lower members of the tool into abutting relation.

The difficulty with most tools formed in more than one piece and adapted to be attached to machines, motors and the like is that the pieces of the tool become separated from each other and lost; in order to avoid this the lower half 4 of the tool carries a lug 10 and the upper half 7 of the tool carries a similar lug 11, both of the lugs 10 and 11 being connected with each other by a suitable length of chain 12 which prevents the loss of the upper half.

In the modification shown in Fig. 4 the parts 13 and 14 forming the upper and lower halves are identical with the parts 4 and 7 of the previously described tool and are connected by a chain 15 in the same manner and hence no detail description of these parts is necessary except the statement that they comprise the two parallel dies C and D one of which is larger than the other so that cables of different sizes may be spliced, or one cable of a duplex cable may be spliced in one opening or die while the other cable rests in the other opening or die and is not acted upon.

In the form shown in Fig. 5 the members G and H are drilled as shown at 16 and 17 to accommodate attaching rings 18 and 19 of chain 20. This construction provides a practical means of attaching the chain and obviates the necessity of providing ears such as are described in connection with the preceding forms of the invention, and which ears are liable to be broken off and thereby permit separation of the parts G and H.

I claim:

In a splicing tool, the combination of a pair of individual separable blocks having abutting flat faces and provided with registering transverse grooves in the flat faces thereof to form an integral base die member and an integral mating upper die member normally resting upon the base member to provide an anvil having a flat upper unobstructed anvil face extending from end to end of the latter member, the base die member being provided with centering pins upstanding from the flat face of such member at opposite sides of the groove therein and the upper die member being provided at opposite sides of its grooves with openings therethrough freely receiving said pins, the pins terminating short of the anvil face of the upper die member, and flexible means connecting the members, the base member being provided with an integral laterally projecting ear whereby said member may be secured to a support.

In testimony whereof I affix my signature.

NEWTON K. BOWMAN. [L. S.]